Figure 1:
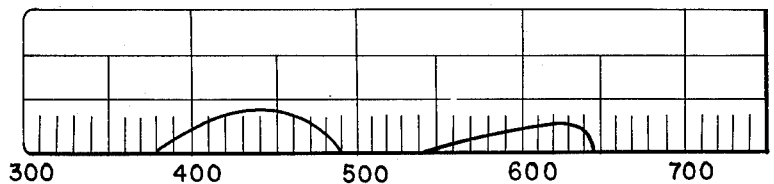

9-(p-ACETOPHENETIDIDO)-3,3'- DIMETHYLTHIACARBOCYANINE
p- TOLUENESULFONATE

9-ACETANILIDO-3,3'-DIMETHYLTHIACARBOCYANINE
p-TOLUENESULFONATE 9-(p-ACETOPHENETIDIDO)-3,3'- DIMETHYL-4,5,4',5'-DIBENZO-
THIACARBOCANINE CHLORIDE

Leslie G. S. Brooker
Frank L. White
INVENTORS

United States Patent Office 2,735,770
Patented Feb. 21, 1956

2,735,770

SENSITIZED PHOTOGRAPHIC SILVER HALIDE EMULSIONS

Leslie G. S. Brooker and Frank L. White, Rochester, N. Y., assignors to Eastman Kodak Company, Rochester, N. Y., a corporation of New Jersey Original application October 4, 1952, Serial No. 313,194, now abandoned. Divided and this application June 16, 1954, Serial No. 437,110

9 Claims. (Cl. 95—7)

This invention relates to photographic emulsions containing new carbocyanine dyes.

The new carbocyanine dyes used in our invention can be represented by the following general formula:

I
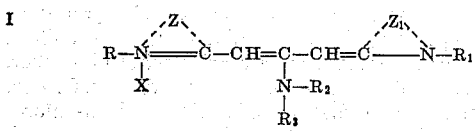

wherein R and R₁ each represents an alkyl group, such as methyl, ethyl, n-propyl, isopropyl, n-butyl, isobutyl, benzyl (phenylmethyl), β-phenylethyl, β-hydroxyethyl, carbomethoxymethyl, β-carbomethoxyethyl, etc., R₂ represents an acyl group, such as acetyl, propionyl, n-butyryl, isobutyryl, benzoyl, o-, m-, and p-toluyl, o-, m-, and p-methoxybenzoyl, etc., R₃ represents a hydrogen atom, an alkyl group, such as methyl, ethyl, n-propyl, isopropyl, n-amyl, n-heptyl, n-octyl, etc., or an aromatic group, such as phenyl, o-, m-, and p-tolyl, α-naphthyl, β-naphthyl, o-, m-, and p-chlorophenyl, o-, m-, and p-methoxyphenyl, o-, m-, and p-ethoxyphenyl, etc., X represents an acid radical, such as chloride, bromide, iodide, perchlorate, thiocyanate, benzenesulfonate, p-toluenesulfonate, methylsulfate, ethylsulfate, etc., and Z and Z₁ each represents the non-metallic atoms necessary to complete a heterocyclic nucleus selected from those of the benzothiazole series, such as benzothiazole, 5-methylbenzothiazole, 5-ethylbenzothiazole, 5-chlorobenzothiazole, 5-bromobenzothiazole, 6-methylbenzothiazole, 6-ethylbenzothiazole, 6-chlorobenzothiazole, 6-bromobenzothiazole, 5-methoxybenzothiazole, 5-ethoxybenzothiazole, 6-methoxybenzothiazole, 6-ethoxybenzothiazole, 5-phenylbenzothiazole, 6-phenylbenzothiazole, 5-aminobenzothiazole, 6-aminobenzothiazole, 5-dimethylaminobenzothiazole, etc., and those of the naphthothiazole series, such as α-naphthothiazole, β-naphthothiazole, etc.

It is, therefore, an object of our invention to provide new carbocyanine dyes. Still another object is to provide a method for making these new dyes. Another object is to provide photographic silver halide emulsions sensitized with these new dyes. Other objects will become apparent from a consideration of the following description and examples.

In accordance with our invention the dyes of Formula I above wherein R₂ represents an acyl group can be prepared by acylation of the corresponding dyes of Formula I above wherein R₂ represents a hydrogen atom. Useful acylating agents comprise organic carboxylic anhydrides, such as acetic anhydride, propionic anhydride, n-butyric anhydride, isobutyric anhydride, benzoic anhydride, etc. The acylations are advantageously effected in the presence of an inert solvent, such as pyridine, quinoline, acetic acid, etc.

According to our invention we provide the dyes of Formula I above wherein R₂ represents a hydrogen atom by reacting together a dye selected from those represented by the following general formula:

II
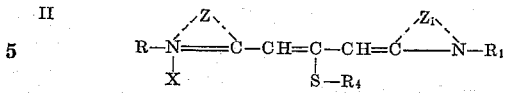

wherein R, R₁, X, Z and Z₁ each have the values given above, and R₄ represents an alkyl group, such as methyl, ethyl, etc., or an aromatic group, such as phenyl, o-, m-, and p-tolyl, etc., with ammonia or a primary amine selected from those represented by the following general formula:

III          R₃—NH₂ where R₃ has the values given above. Heat accelerates the reaction and inert solvents, such as pyridine, quinoline, etc. can be used if desired. The dyes of Formula II above can be prepared in accordance with the method described in Brooker and White U. S. Patent 2,520,358 issued August 29, 1950.

The following examples will serve to illustrate more fully the manner whereby we prepare these dyes.

*Example 1.—9-anilino-3,3'-dimethylthiacarbocyanine p-toluenesulfonate*

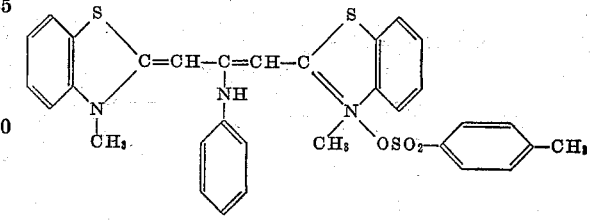

A mixture of 2.77 grams (1 mol.) of 3,3'-dimethyl-9-methylmercaptothiacarbocyanine p-toluenesulfonate, 5.12 grams (1 mol.+1000% excess) of aniline and 20 ml. of dry pyridine was heated at the refluxing temperature for 15 minutes. The cool, much lighter-colored reaction mixture was stirred with 250 ml. of ether. After chilling, the solid was collected on a filter and washed with ether. The residue was stirred, in a beaker, with hot acetone. After chilling, the dye was collected on a filter and washed with acetone. The yield of dye was 100 percent crude and 50 percent after two recrystallizations from ethyl alcohol. The dull orange-red crystals had melting point 186–187° C. with decomposition and they sensitized a photographic gelatino-silver-bromoiodide emulsion to about 650 mu with maximum sensitivity at about 600 mu.

By replacing the aniline used in the above example by a molecularly equivalent amount of p-cyanoaniline, 9-(p-cyanoanilino)-3,3'-dimethylthiacarbocyanine p-toluenesulfonate was obtained as deep-colored crystals.

The dyes of Examples 2 to 7 below were prepared in a manner similar to that described in Example 1 above, except that another organic primary amine was substituted for the aniline of that example.

*Example 2.—9-(m-chloroanilino)-3,3'-dimethylthiacarbocyanine p-toluenesulfonate*

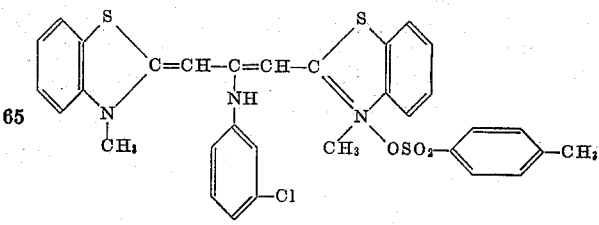

9-(m-chloroanilino)-3,3'-dimethylthiacarbocyanine p-toluenesulfonate was prepared by using 6.38 grams of m-chloroaniline in place of aniline and heating the reaction mixture for 67 minutes at the refluxing temperature. The red crystals with a green reflex had melting point 234–235° C. with decomposition, and they sensitized a photographic gelatino-silver-bromoiodide emulsion to about 635 mu with maximum sensitivity at about 600 mu.

*Example 3.—3,3'-dimethyl-9-p-phenetidinothiacarbocyanine p-toluenesulfonate*

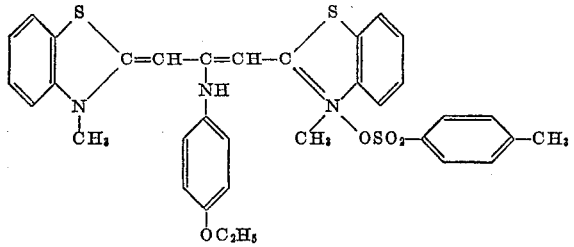

3,3'-dimethyl-9-p-phenetidinothiacarbocyanine p-toluenesulfonate was prepared by using 7.53 grams (1 mol.+1000% excess) of p-phenetidine in place of aniline. The orange crystals had melting point 229–230° C. with decomposition and they sensitized a photographic gelatino-silver-bromoiodide emulsion to about 625 mu with maximum sensitivity at about 595 mu.

*Example 4.—3,3'-dimethyl-9-p-toluidinothiacarbocyanine p-toluenesulfonate*

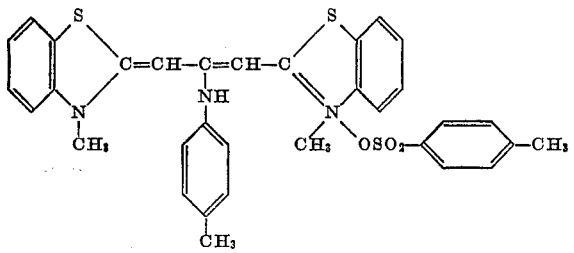

3,3'-dimethyl-9-p-toluidinothiacarbocyanine p-toluenesulfonate was prepared by using 3.21 grams (1 mol.+500% excess) of p-toluidine in place of aniline and heating the reaction mixture at the refluxing temperature for 45 minutes. The orange-red crystals from ethyl alcohol had melting point 223–225° C. with decomposition and they sensitized a photographic gelatino-silver-bromoiodide emulsion to about 630 mu with maximum sensitivity at about 600 mu.

*Example 5.—3,3'-dimethyl-9-m-toluidinothiacarbocyanine p-toluenesulfonate*

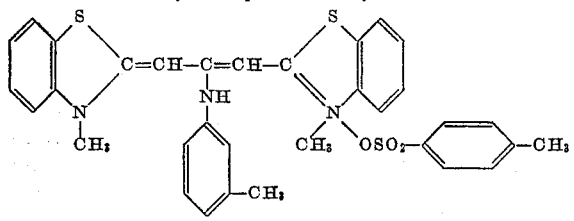

3,3'-dimethyl-9-m-toluidinothiacarbocyanine p-toluenesulfonate was prepared by using m-toluidine in place of aniline and heating the reaction mixture at the refluxing temperature for 50 minutes. The amber needles with green reflex had melting point 147–149° C. with decomposition and they sensitized a photographic gelatino-silver-bromoiodide emulsion to about 640 mu with maximum sensitivity at about 600 mu.

*Example 6.—9-n-heptylamino-3,3'-dimethylthiacarbocyanine p-toluenesulfonate*

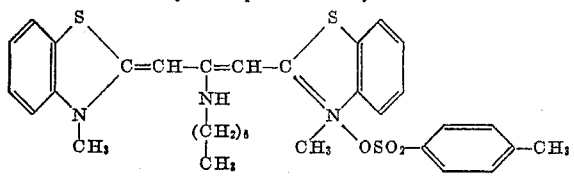

9-n-heptylamino-3,3'-dimethylthiacarbocyanine p-toluene-sulfonate was prepared by using 3.45 grams (1 mol.+500% excess) of n-heptylamine in place of aniline. The orange crystals, from ethyl alcohol plus ether, had melting point 144–146° C. with previous softening, and they sensitized a photographic gelatino-silver-chlorobromide emulsion to about 530 mu with maximum sensitivity at about 500 mu.

*Example 7.—9-benzylamino-3,3'-dimethylthiacarbocyanine p-toluenesulfonate*

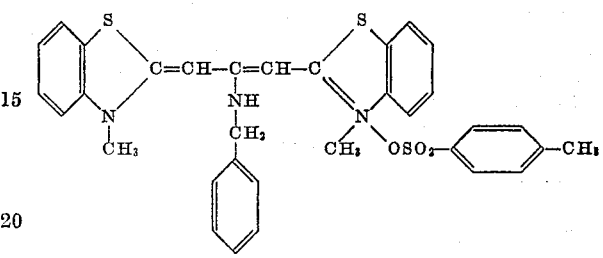

9-benzylamino-3,3'-dimethylthiacarbocyanine p-toluene-sulfonate was prepared by using 3.21 grams (1 mol.+500% excess) of benzylamine in place of aniline. The light orange crystals, from ethyl alcohol plus ether, had melting point 174–177° C. with previous softening, and they sensitized a photographic gelatino-silver-chlorobromide emulsion to about 550 mu with maximum sensitivity at about 500 mu.

*Example 8.—9-amino-3,3'-dimethylthiacarbocyanine p-toluene-sulonate*

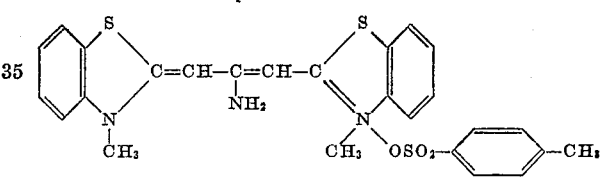

9-amino-3,3'-dimethylthiacarbocyanine p-toluenesulfonate was prepared by passing dry ammonia gas into a suspension of 27.5 grams of 3,3'-dimethyl-9-methylmercaptothiacarbocyanine p-toluenesulfonate in 200 ml. of dry pyridine containing 7.3 grams of triethylamine. As the ammonia was added, the reaction mixture was kept at about 75° C. for one hour, the addition of the ammonia was discontinued, the reaction mixture was allowed to stand overnight and the next day ammonia was added slowly as the reaction mixture was heated at about 115° C. for 80 minutes. The cool reaction mixture was stirred with ether. After chilling, the dye was collected on a filter and washed with ether. The yield was 24.0 grams. The methyl alcoholic solution of the brownish-orange crystals was yellow.

*Example 9.—3-ethyl-3'-methyl-9-p-phenetidinothiacarbocyanine p-toluenesulfonate*

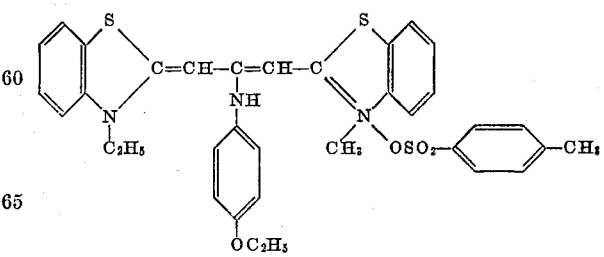

A mixture of 2.84 grams (1 mol.) of 3-ethyl-3'-methyl-9 - methylmercaptothiacarbocyanine p - toluenesulfonate, 4.11 grams (1 mol.+500% excess) of p-phenetidine and 10 ml. of dry pyridine was heated at the refluxing temperature for 30 minutes. The cool reaction mixture was stirred with 250 ml. of ether. After chilling, the solid was collected on a filter and washed with ether. The residue was stirred, in a beaker, with 25 ml. of hot acetone.

After chilling, the dye was collected on a filter and washed with acetone. The yield of dye was 75 percent crude and 49 percent after two recrystallizations from ethyl alcohol, to which a small amount of ether was added just before collecting the dye on the filter. The reddish crystals had melting point 191–192° C. with decomposition and they sensitized a photographic gelatino-silver-bromoiodine emulsion to about 600 mu.

*Example 10.—3,3'-dimethyl-9-p-phenetidino-4,5;4',5'-dibenzothiacarbocyanine chloride*

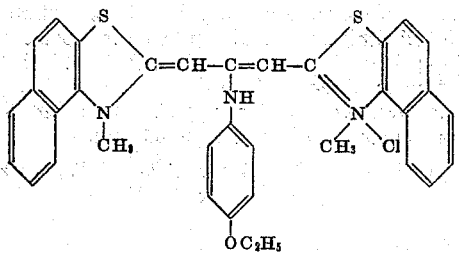

A mixture of 0.87 gram (1 mol.) of 3,3'-dimethyl-9-methylmercapto-4,5;4',-5'-dibenzothiacarbocyanine chloride, 2.51 grams (1 mol.+1000% excess) of p-phenetidine and 10 ml. of dry pyridine was heated at the refluxing temperature for 7 minutes. The cool reaction mixture was stirred with ether. After chilling, the solid was collected on a filter and washed with ether. The residue was stirred, in a beaker, with hot acetone. After chilling, the dye was collected on a filter and washed with acetone. The yield of dye was 97 percent crude and 49 percent after two recrystallizations from ethyl alcohol. The very dark green crystals had melting point 210–211° C. with decomposition and they sensitized a photographic gelatino-silver-bromoiodide emulsion to about 680 mu with maximum sensitivity about 650 mu.

*Example 11.—9-(p-acetophenetidido)-3,3'-dimethylthiacarbocyanine p-toluenesulfonate*

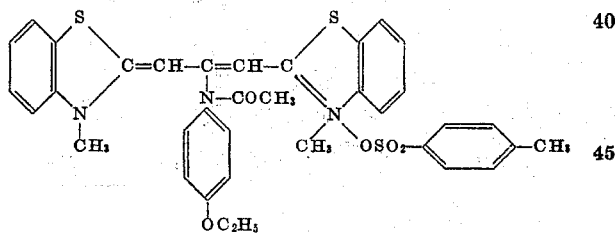

A mixture of 1.29 grams (1 mol.) of 3,3'-dimethyl-9-p-phenetidinothiacarbocyanine p-toluenesulfonate, 1.22 grams (1 mol.+500% excess) of acetic anhydride and 15 ml. of pyridine was heated at the refluxing temperature for 7 minutes. The cool reaction mixture was stirred with 250 ml. of ether. After chilling overnight, the solid was collected on a filter and washed with ether. The residue was stirred, in a beaker, with hot acetone. The suspension was chilled, the dye was collected on a filter and washed with acetone. The yield of dye was 79 percent crude and 58 percent after two recrystallizations from nitromethane. The dark green crystals had melting point 191–192° C. with decomposition and they sensitized a photographic gelatino-silver-bromoiodide emulsion to about 645 mu with maximum sensitivity at about 625 mu.

*Example 12.—9-(m-chloroacetanilido)-3,3'-dimethylthiacarbocyanine p-toluenesulfonate*

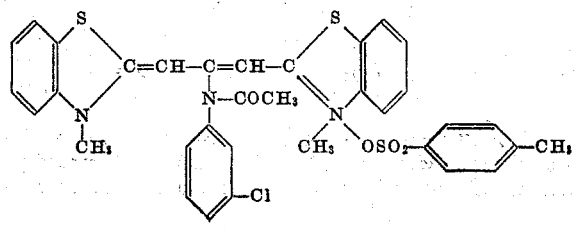

When 9-(m-chloroanilino)-3,3'-dimethylthiacarbocyanine p-toluenesulfonate was acetylated, 9-(m-chloroacetanilido)-3,3'-dimethylthiacarbocyanine p-toluenesulfonate was isolated as dark crystals with a green reflux from ethyl alcohol. The dye had melting point 206–209° C. with decomposition and it sensitized a photographic gelatino-silver-bromoiodide emulsion to about 640 mu with maximum sensitivity at about 625 mu.

*Example 13.—9-acetanilido-3,3'-dimethylthiacarbocyanine p-toluenesulfonate*

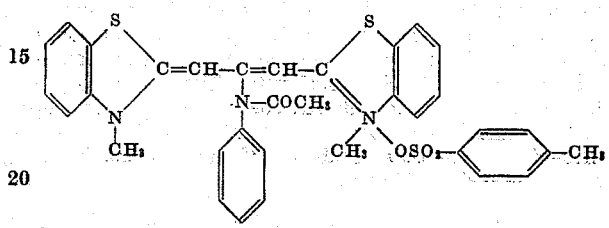

When 9-anilino-3,3'-dimethylthiacarbocyanine p-toluenesulfonate was acetylated, 9-acetanilido-3,3'-dimethylthiacarbocyanine p-toluenesulfonate was isolated as dark bluish crystals from nitromethane plus a little ether. The dye had melting point 188–189° C. with decomposition and it sensitized a photographic gelatino-silver-bromoiodide emulsion to about 650 mu with maximum sensitivity at about 625 mu.

The acetylations in Examples 12 and 13 above were carried out in the same manner as the acetylation described in Example 11.

*Example 14.—9-(p-acetophenetidido)-3-ethyl-3'-methylthiacarbocyanine p-toluenesulfonate*

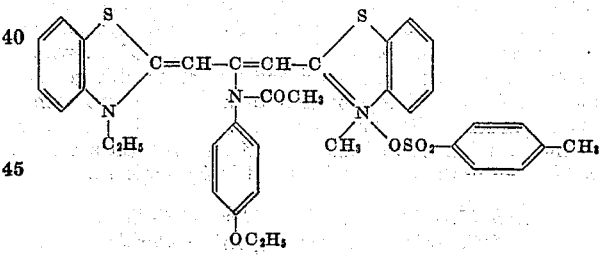

A mixture of 2.84 grams (1 mol.) of 3-ethyl-3'-methyl-9-methylmercaptothiacarbocyanine p-toluenesulfonate, 7.54 grams (1 mol.+1000% excess) of p-phenetidine and 10 ml. of dry pyridine were heated together at the refluxing temperature for 20 minutes. The cool reaction mixture was stirred with 250 ml. of ether. After chilling, the solid was collected on a filter and washed with ether. The residue was stirred, in a beaker, with 35 ml. of hot acetone. After chilling the suspension, the dye was collected on a filter and washed with acetone.

The crude 9-p-phenetidino dye, 2.11 grams, was heated with 1.96 grams (1 mol.+500% excess) of acetic anhydride in 10 ml. of pyridine at the refluxing temperature for 7 minutes. The cool reaction mixture was stirred with 200 ml. of ether. After chilling, the solid was collected on the filter and washed with ether. The residue was stirred, in a beaker, with hot acetone. The suspension was chilled, the dye was collected on a filter and washed with acetone. The crude dye (1.61 grams) was recrystallized from nitromethane and then from ethyl alcohol. The bronze crystals (.28 gram) had melting point 157–158° C. with decomposition and they sensitized a photographic gelatino-silver-bromoiodide emulsion to about 630 mu with maximum sensitivity at about 620 mu.

*Example 15.—9-m-acetotoluidido-3,3'-dimethylthia-
carbocyanine p-toluenesulfonate*

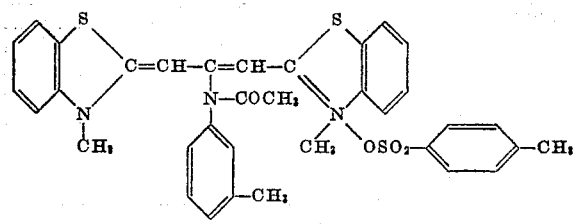

9-m-acetotoluidido - 3,3' - dimethylthiacarbocyanine p-toluenesulfonate was obtained by acetylating the corresponding crude 9-m-toluidino dye, which was prepared from m-toluidine and 3,3'-dimethyl-9-methylmercaptothiacarbocyanine p-toluenesulfonate. The bluish crystalline powder of the acetylated dye decomposed from about 152° C. and it sensitized a photographic gelatino-silver-bromoiodide emulsion to about 640 mu with maximum sensitivity at about 625 mu.

*Example 16.—9-p-acetotoluidido-3,3'-dimethylthiacarbocyanine p-toluenesulfonate*

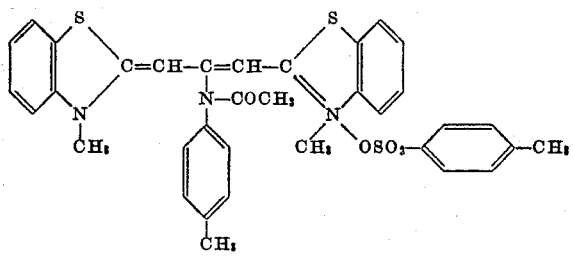

9 - p-acetotoluidido - 3,3' - dimethylthiacarbocyanine p-toluenesulfonate was obtained by acetylating the corresponding crude 9-p-toluidino dye, which was prepared from p-toluidine and 3,3'-dimethyl-9-methylmercaptothiacarbocyanine p-toluenesulfonate. The green crystals of the acetylated dye had melting point 169–173° C. with decomposition, and they sensitized a photographic gelatino-silver-bromoiodide emulsion to about 645 mu with maximum sensitivity at about 625 mu.

The acetylations in Examples 15 and 16 above were carried out in the manner described in Example 14.

*Example 17.—9-(p-acetophenetidido)-3,3'-dimethyl-4,5;4',5'-dibenzothiacarbocyanine chloride*

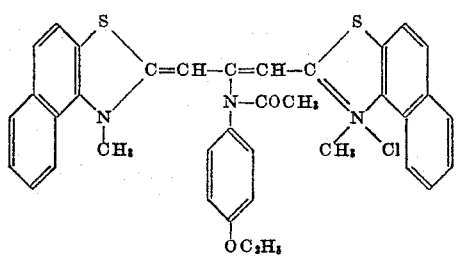

A mixture of 0.35 gram (1 mol.) of 3,3'-dimethyl-9-p-phenetidino-4,5;4',5'-dibenzothiacarbocyanine chloride, 0.56 gram (1 mol.+1000% excess) of acetic anhydride and 5 ml. of dry pyridine was heated at the refluxing temperature for 7 minutes. The cool reaction mixture was stirred with ether. After chilling, the solid was collected on a filter and washed with ether. The residue was stirred, in a beaker, with hot acetone. After chilling, the dye was collected on a filter and washed with acetone. The yield of dye was 0.23 gram crude and 0.08 gram after two recrystallizations from ethyl alcohol. The purplish crystalline powder had melting point 187–189° C. with decomposition and it sensitized a photographic gelatino-silver-bromoiodide emulsion to about 685 mu with maximum sensitivity at about 670 mu.

*Example 18.—9-N-n-heptylacetamido-3,3'-dimethylthia-
carbocyanine p-toluenesulfonate*

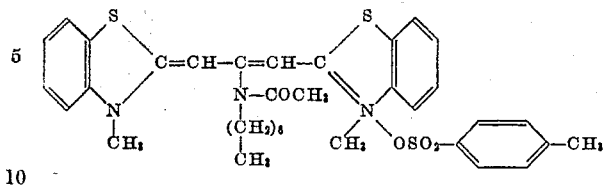

When 9-n-heptylamino-3,3'-dimethylthiacarbocyanine p-toluenesulfonate was acetylated, 9-N-n-heptylacetamido-3,3'-dimethylthiacarbocyanine p-toluenesulfonate was isolated as pale bluish-green crystals, melting at 220–221° C. with decomposition, and they sensitized a photographic gelatino-silver-bromoiodide emulsion to about 645 mu with maximum sensitivity at about 630 mu.

*Example 19.—9-N-benzylacetamido-3,3'-dimethylthiacarbocyanine p-toluenesulfonate*

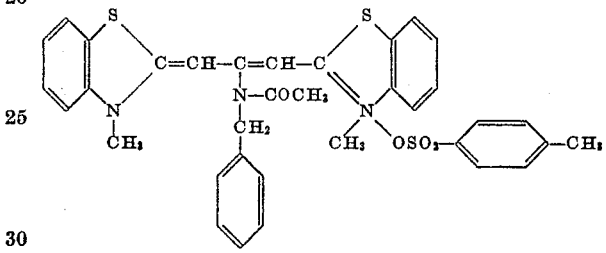

When 9-benzylamino-3,3'-dimethylthiacarbocyanine p-toluenesulfonate was acetylated, 9-N-benzylacetamido-3,3'-dimethylthiacarbocyanine p-toluenesulfonate was isolated as dark red crystals with a green reflux melting at 223–224° C. with decomposition, and they sensitized a photographic gelatino-silver-bromoiodide emulsion to about 640 mu.

*Example 20. — 3,3'-dimethyl-9-N-β-naphthylacetamidothiacarbocyanine p-toluenesulfonate*

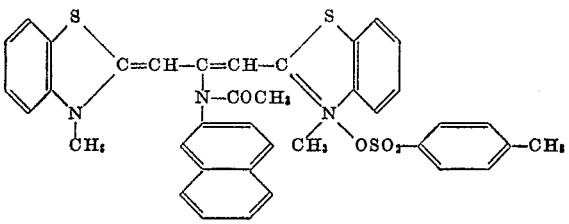

When 3,3' - dimethyl - 9 - β - naphthylaminothiacarbocyanine p-toluenesulfonate was acetylated, 3,3'-dimethyl-9-N-β-naphthylacetamidothiacarbocyanine p-toluenesulfonate was isolated as a dull coppery crystalline powder which was completely decomposed at 198° C., and it sensitized a photographic gelatino-silver-bromoiodide emulsion to about 640 mu with maximum sensitivity at about 625 mu.

The 3,3'-dimethyl-9-β-naphthylaminothiacarbocyanine p-toluenesulfonate used in the above example was prepared in accordance with the process described in Example 1 above, except that β-naphthylamine was used in place of the aniline of Example 1.

*Example 21.—9-acetamido-3,3'-dimethylthiacarbocyanine p-toluenesulfonate*

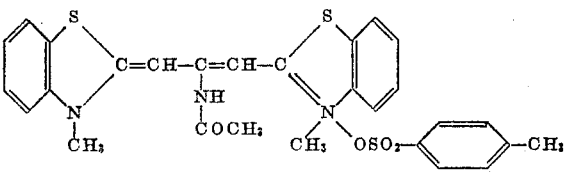

When 9-amino-3,3'-dimethylthiacarbocyanine p-toluenesulfonate was acetylated, 9-acetamido-3,3'-dimethylthiacarbocyanine p-toluenesulfonate was isolated as coppery crystals, melting at 208–210° C. with decomposition, and they sensitized a photographic gelatino-silver-chlorobromide emulsion to about 595 mu with maximum sensitivity at about 560 mu.

The acetylations of Examples 18 to 21 were carried out in the same manner as that of Example 17. In a similar manner, the dyes of Formula I wherein $R_2$ is hydrogen can be acylated with other carboxylic anhydrides, such as propionic anhydride, n-butyric anhydride, isobutyric anhydride, benzoic anhydride, etc.

As shown above we have found that our new dyes spectrally sensitize photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bromiodide developing-out emulsions. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of methyl alcohol and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory.

A quantity of dye is dissolved in methyl alcohol or acetone (or a mixture of methyl alcohol and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromoiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Figure 2:
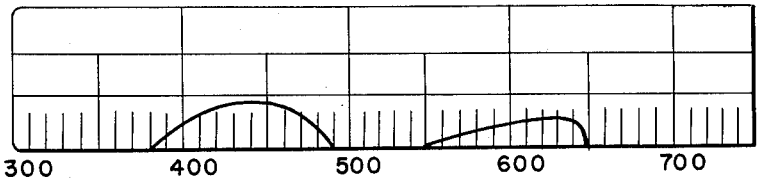
Figure 3:
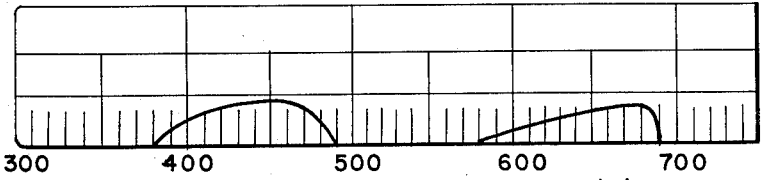

The accompanying drawing further illustrates our invention. Each figure is a diagrammatic reproduction of a spectrogram showing the sensitivity of an ordinary gelatino-silver-bromiodide emulsion containing one of our sensitizing dyes. In Fig. 1, the curve depicts the sensitivity of an ordinary gelatino-silver-bromiodide emulsion containing 9-(p-acetophenetidido)-3,3'-dimethylthiacarbocyanine p-toluenesulfonate. In Fig. 2, the curve depicts the sensitivity of an ordinary gelatino-silver-bromiodide emulsion containing 9-acetanilido-3,3'-dimethylthiacarbocyanine p-toluenesulfonate. In Fig. 3, the curve depicts the sensitivity of an ordinary gelatino-silver-bromiodide emulsion containing 9-(p-acetophenetidido-3,3'-dimethyl - 4,5;4',5' - dibenzothiacarbocyanine chloride.

The dyes represented by Formula I above are also useful in certain supersensitizing combinations for photographic silver halide emulsions.

This application is a division of our copending application Serial No. 313,194, filed October 4, 1952, now abandoned.

We claim:

1. A photographic silver halide emulsion sensitized with a symmetrical carbocyanine dye selected from those represented by the following general formula:

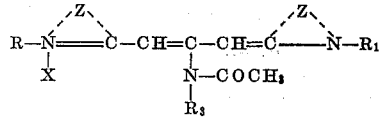

wherein R and $R_1$ each represents an alkyl group, $R_3$ represents a member selected from the group consisting of a hydrogen atom, an alkyl group, and an aromatic carbocyclic group, X represents an acid radical, and Z represents the non-metallic atoms necessary to complete a heterocyclic nucleus selected from the group consisting of those of the benzothiazole series and those of the naphthothiazole series.

2. A photographic silver halide emulsion sensitized with a symmetrical carbocyanine dye selected from those represented by the following general formula:

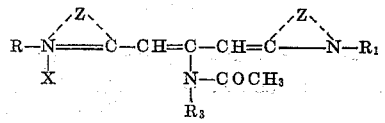

wherein R and $R_1$ each represents an alkyl group containing from 1 to 4 carbon atoms, $R_3$ represents a member selected from the group consisting of a hydrogen atom, an alkyl group containing from 1 to 8 carbon atoms, and an aromatic carbocyclic group containing in addition to the carbon atoms only atoms selected from the group consisting of chlorine, bromine, hydrogen, and oxygen, and Z represents the non-metallic atoms necessary to complete a heterocyclic nucleus selected from the group consisting of those of the benzothiazole series and those of the naphthothiazole series.

3. A photographic silver halide emulsion sensitized with a symmetrical carbocyanine dye selected from those represented by the following general formula:

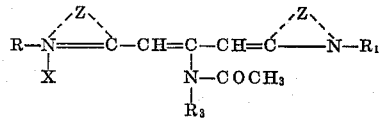

wherein R and $R_1$ each represents an alkyl group containing from 1 to 4 carbon atoms, $R_3$ represents an aromatic carbocyclic group containing in addition to the carbon atoms, only atoms selected from the group consisting of chlorine, bromine, hydrogen, and oxygen, and Z represents the non-metallic atoms necessary to complete a heterocyclic nucleus of the benzothiazole series.

4. A photographic silver halide emulsion sensitized with a symmetrical carbocyanine dye selected from those represented by the following general formula:

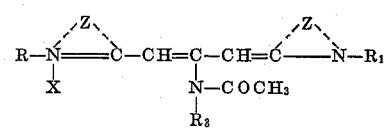

wherein R and $R_1$ each represents an alkyl group containing from 1 to 4 carbon atoms, $R_3$ represents an aromatic carbocyclic group containing in addition to the carbon atoms, only atoms selected from the group consisting of chlorine, bromine, hydrogen, and oxygen, X represents an acid radical, and Z represents the non-metallic atoms necessary to complete a heterocyclic nucleus of the naphthothiazole series.

5. A photographic silver halide emulsion sensitized with the carbocyanine dye having the following formula:

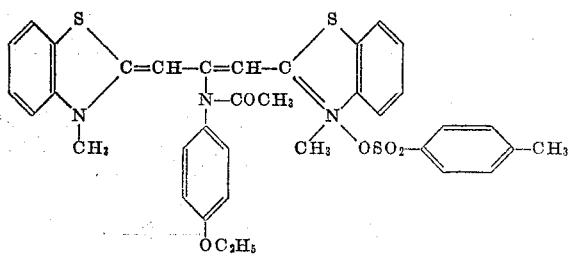

6. A photographic silver halide emulsion sensitized with the carbocyanine dye having the following formula:

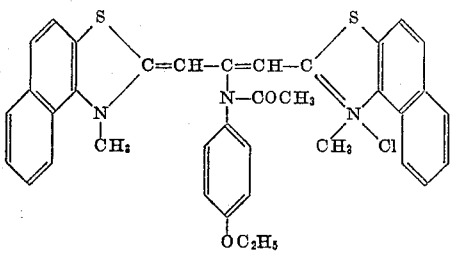

7. A photographic silver halide emulsion sensitized with the carbocyanine dye having the following formula:

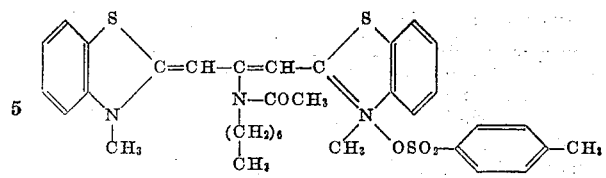

8. A photographic silver halide emulsion sensitized with the carbocyanine dye having the following formula:

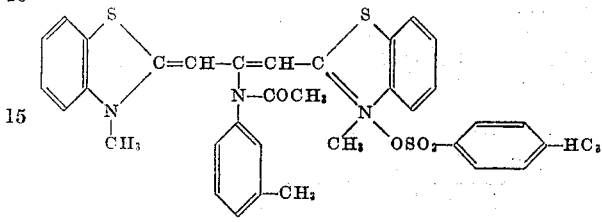

9. A photographic silver halide emulsion sensitized with the carbocyanine dye having the following formula:

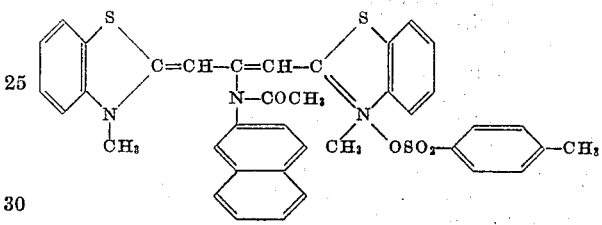

References Cited in the file of this patent
UNITED STATES PATENTS

| | | |
|---|---|---|
| 2,066,966 | Dieterle et al. | Jan. 5, 1937 |
| 2,066,968 | Dieterle et al. | Jan. 5, 1937 |
| 2,637,729 | Kendall et al. | May 5, 1953 |